(12) United States Patent
Hsiung

(10) Patent No.: US 7,277,272 B2
(45) Date of Patent: Oct. 2, 2007

(54) PORTABLE DVD PLAYER WITH BUILT-IN BATTERY

(75) Inventor: Chen Kuo Hsiung, Laguna (HK)

(73) Assignee: Silicon Pyramid Electron, Kowloon (HK)

( * ) Notice: Subject to any disclaimer, the term of this patent is extended or adjusted under 35 U.S.C. 154(b) by 269 days.

(21) Appl. No.: 11/216,553

(22) Filed: Aug. 31, 2005

(65) Prior Publication Data
US 2007/0008682 A1    Jan. 11, 2007

(30) Foreign Application Priority Data
Jul. 6, 2005 (CN) ................. 2005 2 0060764

(51) Int. Cl.
H05K 5/00 (2006.01)
(52) U.S. Cl. ................. 361/679
(58) Field of Classification Search ........ 361/679
See application file for complete search history.

(56) References Cited

U.S. PATENT DOCUMENTS

| | | | | |
|---|---|---|---|---|
| 4,481,382 A | * | 11/1984 | Villa-Real | 455/556.1 |
| 4,633,323 A | * | 12/1986 | Haberkern et al. | 348/838 |
| 5,499,221 A | * | 3/1996 | Ito et al. | 369/53.22 |
| 7,184,259 B2 | * | 2/2007 | Marler et al. | 361/679 |
| 2004/0005138 A1 | * | 1/2004 | Yano et al. | 386/46 |
| 2005/0025466 A1 | * | 2/2005 | Yen et al. | 386/125 |
| 2005/0213297 A1 | * | 9/2005 | Ulla et al. | 361/683 |
| 2006/0130078 A1 | * | 6/2006 | Zhang | 720/600 |

* cited by examiner

Primary Examiner—Yean-Hsi Chang
(74) Attorney, Agent, or Firm—Much Shelist

(57) ABSTRACT

A portable DVD player with a built-in battery located in compartments disposed on opposite sides of the axle on which the DVD is located. The compartments contain the batteries and the closures for the compartments and are secured to the main body to positively locate the batteries in position.

4 Claims, 2 Drawing Sheets

PORTABLE DVD PLAYER WITH BUILT-IN BATTERY

This application is based on a Chinese Application No. 2005200607646 filed Jul. 6, 2005.

TECHNICAL FIELD

This new utility model is a DVD player, particularly, a Portable DVD player with a built-in battery.

BACKGROUND OF THE INVENTION

Existing portable DVD players are available in various structures, usually powered in two ways, including AC converted to DC supply or a battery arrangement. Usually, the battery is a specially designed lithium battery or lithium-ion battery, which is costly, uncommon and apt to pollute. Commonly used batteries, including AA or AAA battery or rechargeable batteries, are inexpensive, widely available, and environmentally friendly, but portable DVD players using such batteries are not yet available on the market. Similar electronic products on the market using such batteries are portable CD players. Typically, a portable CD player has a battery compartment at the bottom and sealed with a closure. Such a design makes battery replacement easy but has a number of drawbacks. The compartment closure may get loose (e.g., due to accidental collision or being dropped) and the battery may come out or the closure may easily get damaged and fail to seal the compartment thus creating problems.

SUMMARY OF THE INVENTION

The purpose of this new utility model is to provide a portable DVD player with a built-in battery system that uses common batteries. The system must be rationally structured, reliable, not apt to leakage, and free from the present technical defects.

The purpose of this new utility model is achieved through the following arrangement: This novel portable DVD player with a built-in battery consists of a main body and cover. The cover is connected to the main body. The battery compartment is set inside of the main body and has a compartment closure.

The compartment closure is hinged or wedged-at one end to the compartment opening, and wedged at the other end to the compartment opening through a spring card.

There may be 2 to 4 compartments set respectively around the rotating axle inside the main body. Each compartment may hold 2-4 AA or AAA cells or rechargeable cells.

After a compartment closure is fixed over its respective compartment opening, the upper side of the compartment closure should be at the same level or a little lower than the upper side of the main body. This arrangement does not interfere with the normal use of disks.

This new utility model is an improvement over the existing technologies in a number of respects:

(1) This novel Portable DVD player uses widely available and environmentally friendly AA or AAA batteries or rechargeable batteries instead of the costly and uncommon lithium battery or lithium-ion battery. This prevents a situation in which the DVD player cannot be used normally when the battery is used up and not rechargeable. (2) The portable DVD player is designed with a built-in battery which battery is prevented from dropping out due to accidental collision or fall. The novel design also helps protect the compartment closure from damage or getting loose.

To have a better understanding of the invention, reference is made to the following detailed description of the invention, from the claims and from the accompanying drawings in which:

DETAILED DESCRIPTION OF THE DRAWINGS

This new utility model will be exemplified and illustrated in greater detail below, and its applications are not limited to those provided here.

Figure 1:
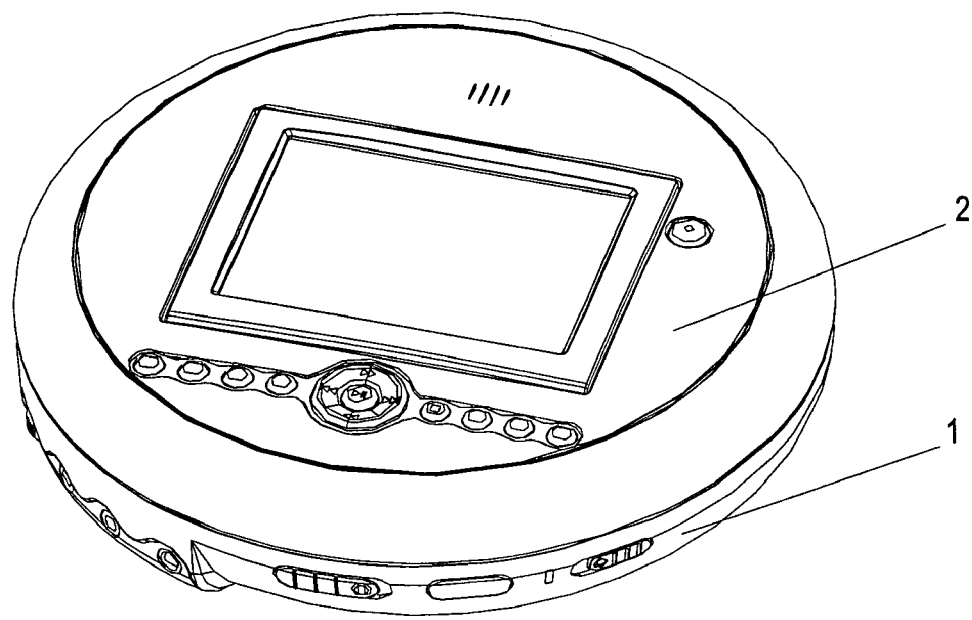
FIG. 1 shows a perspective view of applicants' novel portable DVD player.
Figure 2:
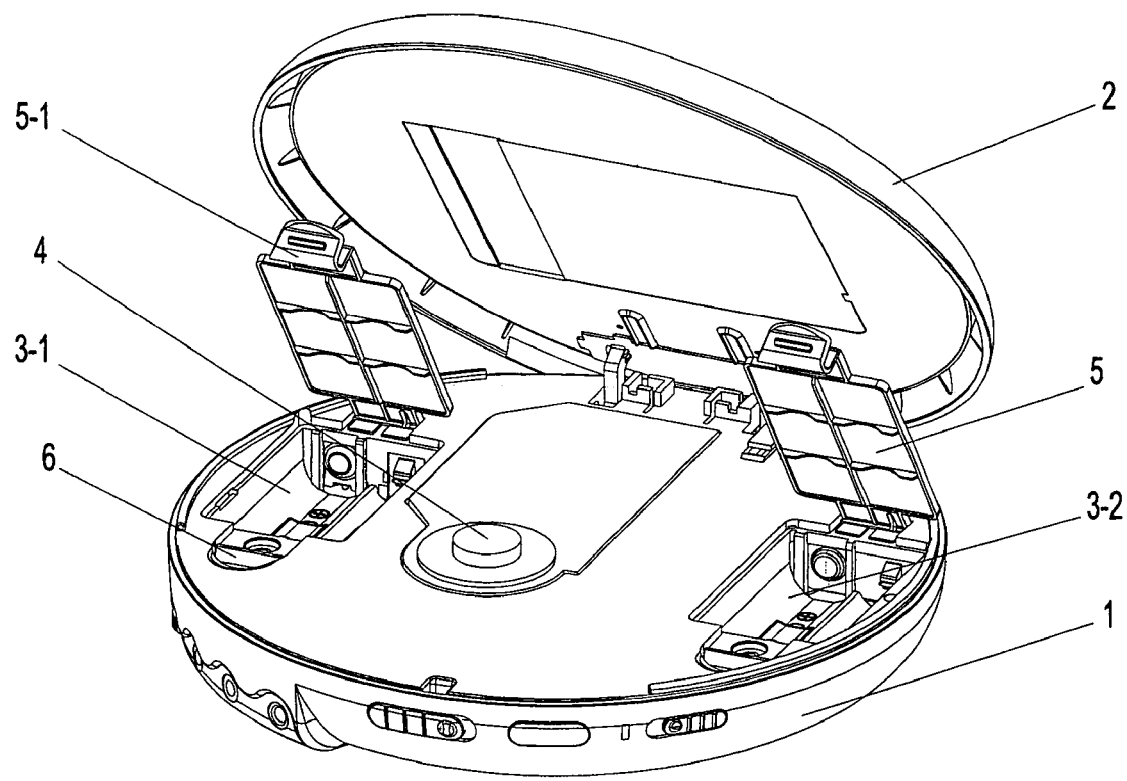
FIG. 2 shows the DVD player of FIG. 1 in the open position with the battery compartments open.
Figure 3:
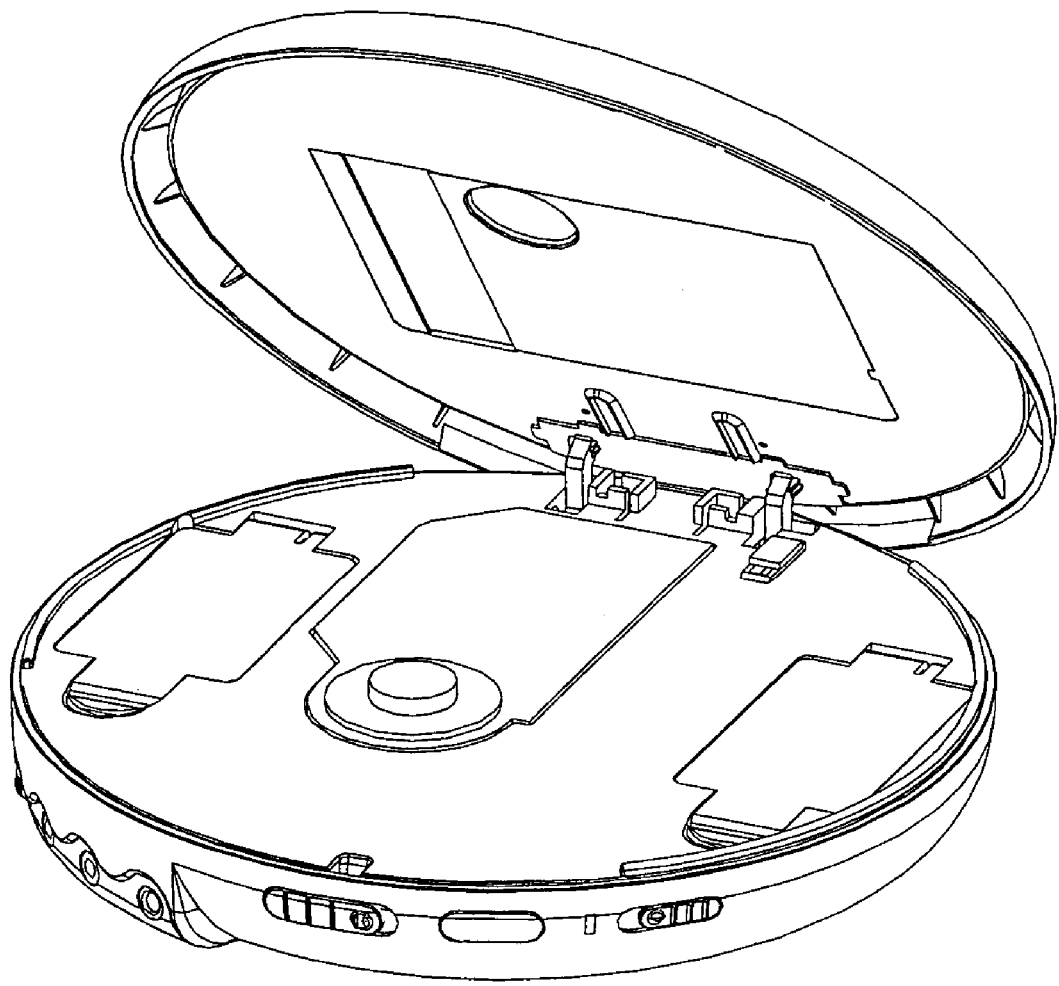
FIG. 3 shows a DVD player in the open position to receive a disk with the battery compartments closed.

FIGS. 1-3 show the structure of this new utility model. As shown in FIG. 1, this portable DVD player with built-in battery consists of the main body 1 and a cover 2, which are connected, as shown in FIG. 2. The battery compartments are set inside the main body 1 and comprises two chambers 3-1 and 3-2, located on the opposite sides of the rotating axle 4 inside the main body. Each compartment may hold 2 AA batteries or rechargeable cells. Covering the openings of the two compartments 3-1 and 3-2 is a closure 5 that is hinged at one end of the compartment opening, and wedged at the other end in the opening 6 through a spring card 5-1. When the compartment closure 5 is secured in place over the compartment opening as shown in FIG. 3 the upper side of the compartment closure 5 should be at the same level as that of the upper side of the main body 1. Thus, the closure does not interfere with the disks when in use.

It is intended to cover by the appended claims all embodiments and modifications that fall within the true spirit and scope of the invention.

The invention claimed is:

1. A portable DVD player with a built-in battery, consisting of a main body including a rotating axle for receiving a DVD disk, and said main body includes two battery compartments with one battery compartment being located on each side of the axle, a closure for each compartment, a cover for said main body including a viewing screen located in said cover, and means for hinging the cover to said main body.

2. The portable DVD player as set forth in claim 1 in which each compartment closure for the battery compartments includes a spring means secured thereto for fitting into an opening defined by said main body adjacent each battery compartment, each compartment closure can resiliently fit into its respective opening defined by said main body to secure the compartment closure in position relative to the main body to prevent the battery compartment from inadvertently opening.

3. The portable DVD player as set forth in claim 2 in which the spring means consists of a spring card extending from the end of said each closure into said opening.

4. The portable DVD player as set forth in claim 1 main body defines an upper surface and the battery compartment closure are at the same level or lower than the upper surface of the main body so that the battery compartments do not interfere with a DVD disk disposed on the rotating axle.

* * * * *